United States Patent [19]

Aldridge, Jr.

[11] Patent Number: 4,523,499
[45] Date of Patent: Jun. 18, 1985

[54] DISC BRAKE LATHE

[75] Inventor: R. Warren Aldridge, Jr., Huntsville, Ala.

[73] Assignee: Spencer Wright Industries, Inc., Chattanooga, Tenn.

[21] Appl. No.: 588,010

[22] Filed: Mar. 9, 1984

Related U.S. Application Data

[63] Continuation-in-part of Ser. No. 474,531, Mar. 11, 1983.

[51] Int. Cl.³ .............................................. B23B 5/02
[52] U.S. Cl. ...................................... 82/4 A; 82/38 A
[58] Field of Search ............... 82/DIG. 9, 4 A, 38 A, 82/4 R, 21 R, 27, 24 R; 74/574, 625; 51/106 R; 192/93 R, 95, 67 R; 83/823, 835; 188/218 A, 380, 381

[56] References Cited

U.S. PATENT DOCUMENTS

| | | | |
|---|---|---|---|
| 354,906 | 12/1886 | Hunt | 192/93 R |
| 449,087 | 3/1891 | Prest | 192/93 R |
| 1,299,258 | 4/1919 | Strite | 192/93 R |
| 2,434,498 | 1/1948 | Klassett | 82/3 |
| 2,595,940 | 5/1952 | Guett | 192/93 R |
| 2,911,764 | 11/1959 | Steggeman | 51/106 R |
| 3,196,711 | 7/1965 | Spohn | 74/625 |
| 3,691,878 | 9/1972 | Mitchell | 82/4 A |
| 3,710,661 | 1/1973 | Mitchell | 82/4 A |
| 3,903,765 | 9/1975 | Morse | 82/27 |
| 4,151,766 | 5/1979 | Eichenhofer | 82/4 A |
| 4,178,819 | 12/1979 | Mahon | 82/4 A |
| 4,226,146 | 10/1980 | Ekman | 82/4 A |
| 4,266,454 | 5/1981 | Mitchell et al. | 82/4 A |
| 4,388,846 | 6/1983 | Kopecko et al. | 82/4 A |

FOREIGN PATENT DOCUMENTS

| | | | |
|---|---|---|---|
| 661480 | of 1963 | Canada | 82/4 A |
| WO82/01678 | 5/1982 | PCT Int'l Appl. | 82/4 A |

Primary Examiner—Francis S. Husar
Assistant Examiner—Jerry Kearns
Attorney, Agent, or Firm—C. A. Phillips; Michael L. Hoelter

[57] ABSTRACT

A rotor disc brake lathe for simultaneously machining both left- and right-hand disc brake rotors of a vehicle wherein the rotors are mounted on opposite ends of a centrally supported horizontal drive shaft, and a pair of tool arm assemblies are mounted on both opposite end regions of a horizontal cross arm which is moved vertically on machine ways to effect selective engagement with and machining of the rotors. A spring biased vibration dampener is mounted on one of each pair of tool arms for engagement with one side of each rotor during the machining operation. A clutch mechanism to allow selective manual or motor driven vertical feed of the cross arm is provided.

17 Claims, 10 Drawing Figures

DISC BRAKE LATHE

CROSS REFERENCE OF RELATED APPLICATIONS

This application is a continuation-in-part of application Ser. No. 474,531, filed Mar. 11, 1983.

TECHNICAL FIELD

This invention relates generally to machinery for the resurfacing of automotive brake discs or rotors, and particularly to an improved mechanism adapted to stably machine a pair of brake rotors simultaneously.

BACKGROUND ART

Disc brakes are widely employed on automobiles manufactured in the past few years, particularly for the front wheels of a vehicle. Frequently, just as in the case of drum brakes, vehicle users will fail to timely replace brake linings with the result that the metal associated with holding the brake lining in place will be allowed to engage the face of a brake rotor and score the surface of the rotor. This brake rotor will then need to be resurfaced before a new lining, a disc pad, is installed. The resurfacing of brake discs has become a very substantial business, and the man-hours of labor required of operators to resurface them is tremendous.

Existing equipment is such that machining speeds are frequently limited by the tendency of rotors to vibrate or chatter. Thus, at present, with existing equipment, the typical time required to machine a single brake rotor is approximately 10 minutes. Presently known rotor lathes may employ one of several type dampening devices. In one type, magnets are simply placed on a portion of a disc to change its mass; in another, a band of flexible material is wrapped around the outer periphery of a disc; in a third, one or two fabric-type materials are frictionally biased against the surface of a rotor, being held by fixed mounted arms; and finally, it is understod that in one, a pivotally coupled hardware member is imposed against the face of a rotor at a fixed location. Significantly, the existing devices have not enabled chatter-free machining at rates which enable a rotor to be machined in significantly less than about 10 minutes.

A still further problem is that with existing machinery, discs are mountable in a single direction, and this results in a machined spiral thread-like surface on each side of a disc wherein the spiral threads toward the center of the disc in the same direction for each brake disc. Since two discs from a pair of opposite wheels of a vehicle are mounted on the vehicle in a right-hand and left-hand manner, the spiral-like surfaces react oppositely on the pads of opposite wheels. This lack of symmetry can produce an unbalance in braking effects on opposite wheels, and in some instances produce undesired vibrations.

It is an object of this invention to provide a basically new configuration for brake lathes which substantially decreases the vibration problem, enabling a reduction in machining times by a factor of from 15 to 25, thus tremendously reducing the labor costs in the servicing or machining of disc brake rotors. A further object is to provide a brake lathe adapted to resurface both left and right wheel rotors at one time and in such a manner that the spiral threads produced rotate in the same direction on right-hand and left-hand wheels of a vehicle, thus accompanying cost reduction with enhanced quality of workmanship.

SUMMARY OF THE INVENTION

In accordance with this invention, a disc brake rotor lathe, chattering is prevented by an assembly in which a solid block is resiliently biased against a rotor and also adjustably operated into and away from engagement with the side of a rotor, engagement at least being adjacent to the outer edge of the rotor, but preferably maintained in an adjacent relation with the radial position of the cutter employed to machine the rotor. As a further feature of this invention, right- and left-hand disc brake rotors of a vehicle would be similarly mounted on oppositely positioned shaft locations of the rotor lathe and rotated. A pair of tool holding arms are mounted on a cross arm, each arm is enabled to unchatteringly engage one disc brake rotor. A screw drive is employed to selectively move the arms and thus the cutting tools over both surfaces of the rotors at a substantial cutting rate, whereby the rotors are simultaneously machined, and wherein the cutting thread from machining is identically cut on each brake disc rotor with respect to right and left engaging brake pads of a vehicle.

BRIEF DESCRIPTION OF THE DRAWINGS

FIG. 6 is a broken elevational view of a detail of construction of the cross arm.

DETAILED DESCRIPTION OF THE INVENTION

Figure 1:
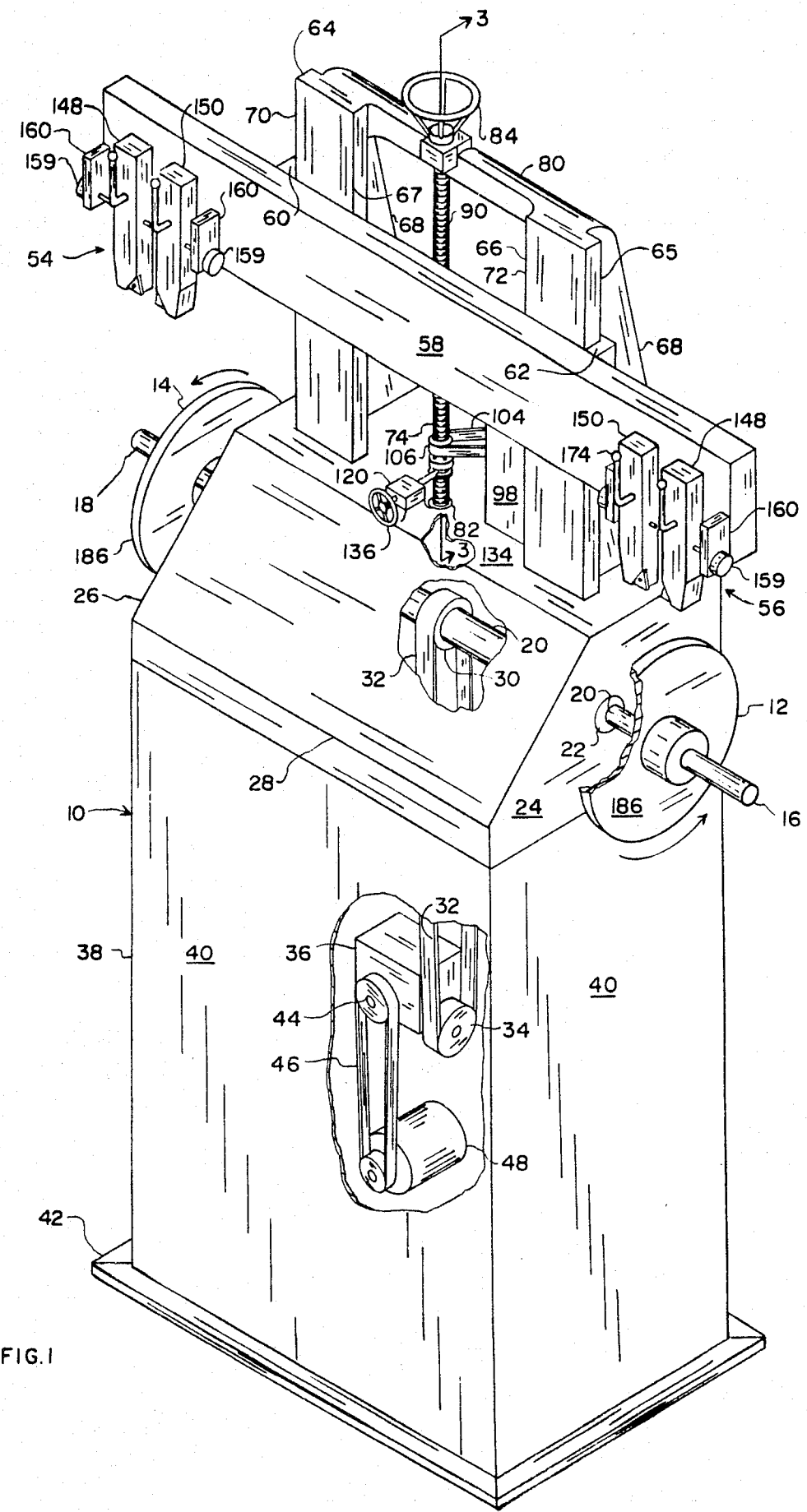
FIG. 1 is a pictorial view as seen from the front and to one side of the brake lathe of this invention.
Figure 2:
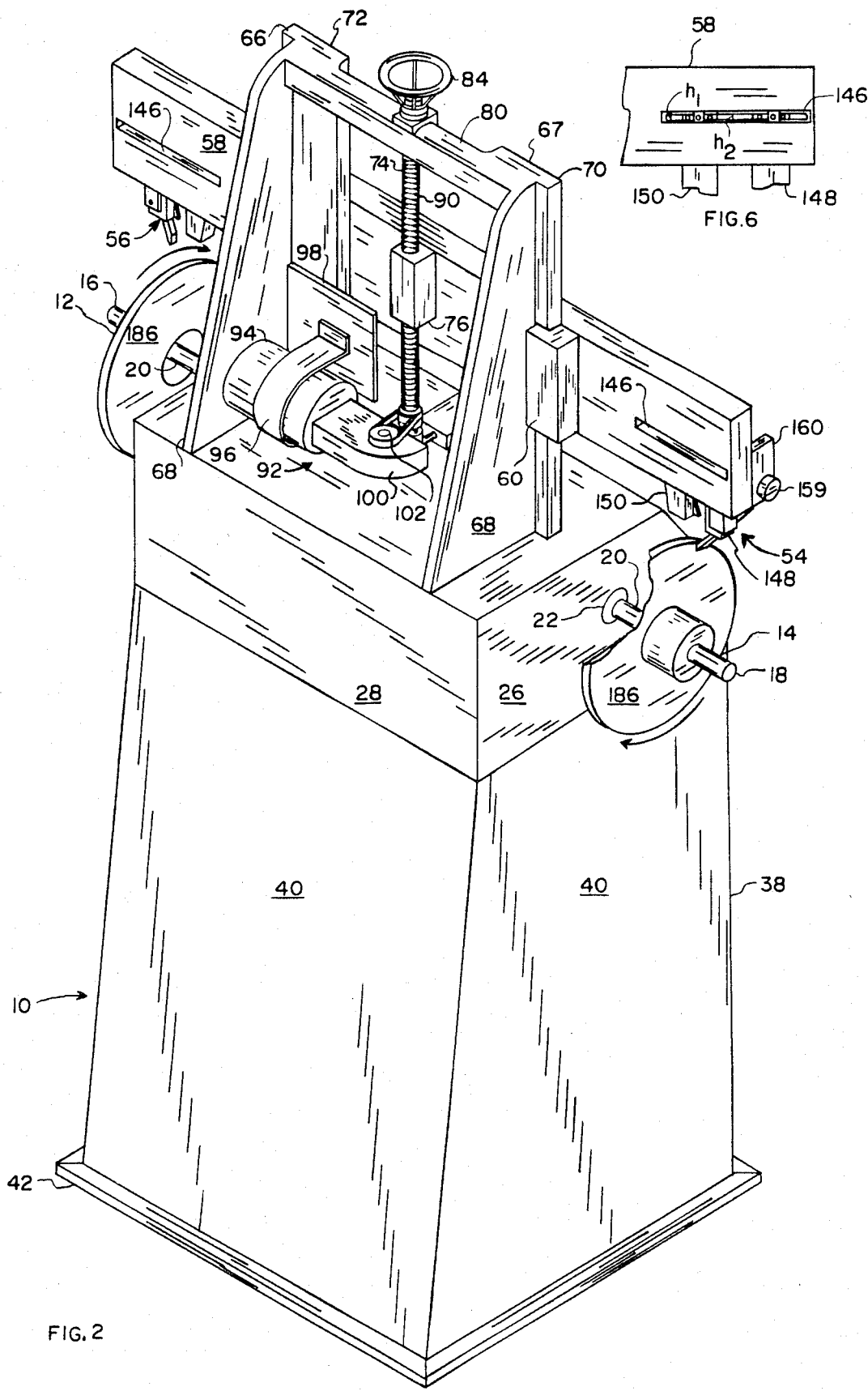
FIG. 2 is a pictorial view as seen from the rear and to one side of the brake lathe shown in FIG. 1. Additionally, this figure illustrates the mounting of an antichattering assembly.

Referring to the drawings, and initially to FIGS. 1 and 2, a rotor disc brake lathe 10 is constructed to simultaneously machine two brake rotors 12 and 14 at a time. These rotors are mounted on opposite end regions 16 and 18 of a shaft 20. Shaft 20 is supported by bearing units 22 attached to opposite side walls 24 and 26 of machine base 28. Machine base 28 is a casting having side walls typically 1¾" to 2" thick, which thus provide a stable support for rotor disc brake lathe 10. Shaft 20 is driven by a pulley 30 on shaft 20 via a belt 32, in turn driven by a pulley 34 attached to reduction gear box 36, diagrammatically illustrated and attached (by means not shown) to machine stand 38 which supports machine base 28. Machine stand 38 is not illustrated in detail but would include framing members (not shown) covered by a plate 40. Plate 40 extends around stand 38 and encloses and provides a protective cover to interior machinery. A bottom plate 42 provides a base for machine stand 38. Gear box 36 is driven by an input drive pulley 44 via a belt 46 from motor 48, diagrammatically illustrated and attached by means not shown to supports not shown.

Figure 4:
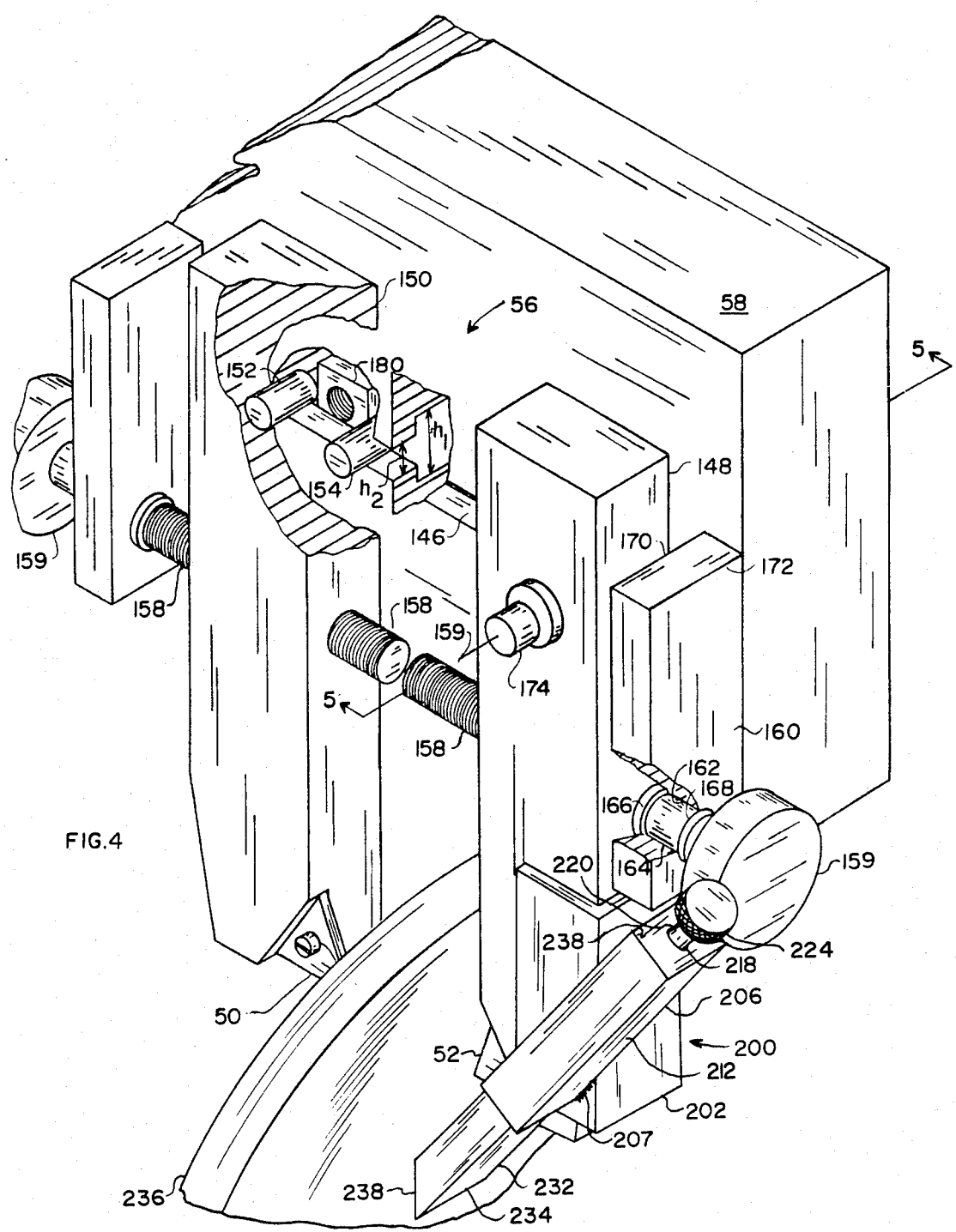
FIG. 4 is a pictorial view of a caliper assembly, with a portion of the tool arms and locking arms broken away, and including an antichattering assembly.

By the drive system just described, rotors 12 and 14, from the left-hand and right-hand wheel assemblies of a vehicle, are driven in a single direction as indicated by the arrows. Rotors 12 and 14 are coordinately machined by two pairs of cutting tools 50 and 52 (FIG. 4). One of each pair is supported on left-hand tool holding assembly 54, and the other of each pair is supported on right-hand tool holding assembly 56. These tool assemblies are supported on a cross arm 58 and are particularly illustrated in FIGS. 4 and 5 and are described below with respect to these figures.

As is to be emphasized, shaft 20 is rigidly mounted whereby its rotational axis is precisely maintained. Coordinately with this, tool assemblies 54 and 56 are comparably supported such that, with a relatively high rate of feed and cutting for cutting tools 50 and 52 over the face of the brake rotors, there will be no significant deflection of the cutting tools, and thus accuracy is preserved.

As a primary feature of accomplishing this, cross arm 58 is constructed of a rigid plate of cast iron having a thickness of $1\frac{1}{2}''$ to 2" inches and a width of 6" to 8". It includes a pair of machine surfaces 60 and 62 formed integrally with cross arm 58. Cross arm 58 is supported by ways 66 and 67 on an upstanding support assembly 68 which is integrally cast with machine base 28 for rigidity between working members of the machine. Upstanding support 68 has left side vertical support 70 and right side vertical support 72, and each of these have machined ways 64 and 65 on back, side, and front surfaces which engage opposite machined surfaces 60 and 62 on cross arm 58. By this structural arrangement, cross arm 58, and thus the cutting tools on calipers 54 and 56, are vertically movable to effect stable and unchattering engagement of the cutting tools with the brake rotors at substantial cutting rates.

Figure 3:
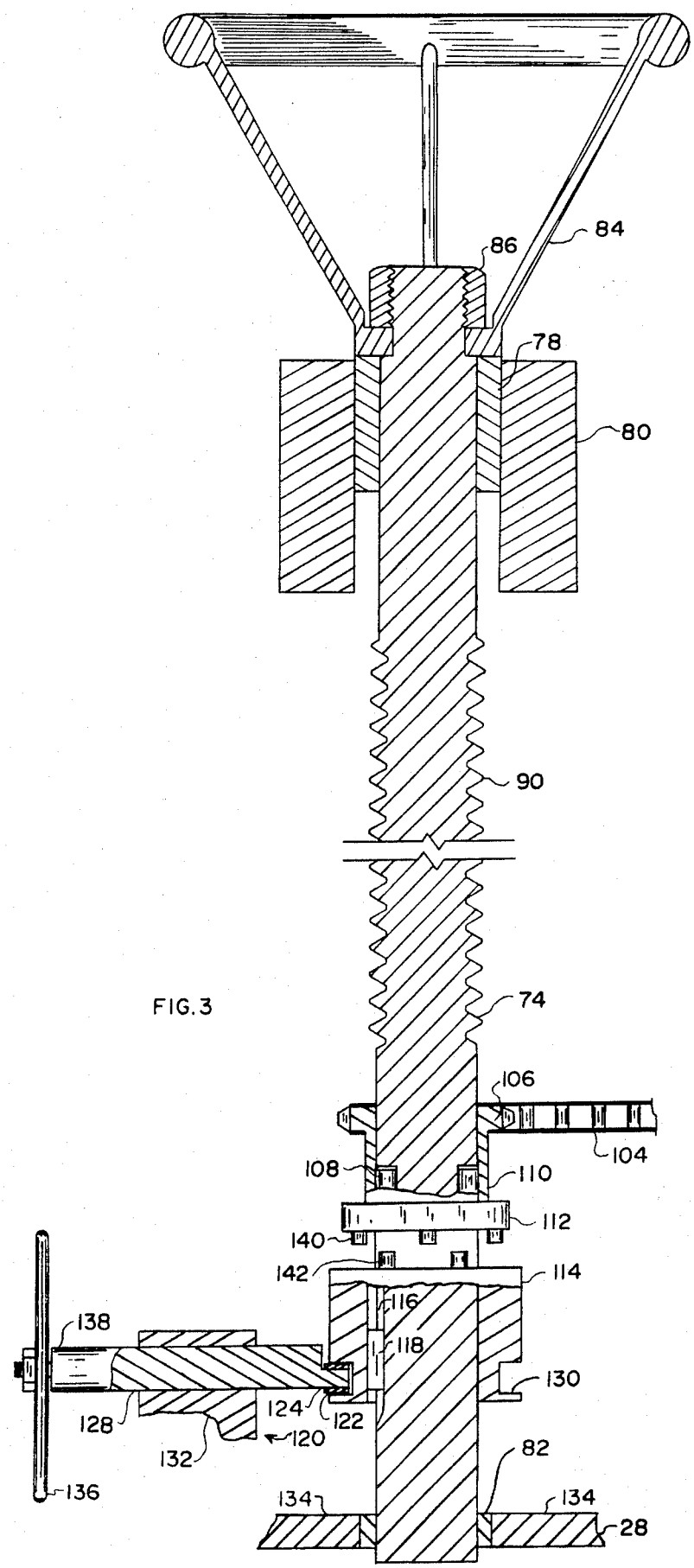
FIG. 3 is a sectional view of a vertical drive screw assembly as seen along line 3—3 of FIG. 1.

Automatic feed, manual feed, and return movement of cross arm 58 are provided, and, to examine this aspect of this applicant's machine, additional reference is made to FIG. 3. Vertical movement of cross arm 58 is achieved by rotation of a lead screw 74 which passes through threaded block 76 (FIG. 2) integrally cast with, or rigidly attached to, cross arm 58. Lead screw 74 is mounted to be secured from axial movement (by means not shown) and is rotatable in a top bushing 78 in cross member 80 of upstanding support 68 and in a lower bushing 82 in the top plate portion of base 28. Manual operation is effected by hand wheel 84 rigidly attached to a top end of lead screw 74 by virtue of a nut 86 screwed on a threaded portion of lead screw 74. Accordingly, as will be noted, by the manual rotation of hand wheel 84, threads 90 of lead screw 74 will cause threaded block 76, and thereby cross arm 58, to be raised or lowered, depending upon the direction of rotation of hand wheel 84.

Alternately, lead screw 74 is driven by power drive assembly 92 (FIG. 2). Driving power is provided by a reversible motor 94 mounted by mounting strap 96 on plate 98, in turn attached to vertical support 72 of upstanding support 68. Motor 94 drives a speed reducer 100 which provides rotary output via a sprocket 102 and drive chain 104. Drive chain 104 (FIG. 3) in turn drives a sprocket 106 which is mounted on bearings 108 to freely rotate about lead screw 74. Sprocket 106 is attached via a coupling sleeve 110 to a dog-type interlocking coupler 112 whcih thus turns with sprocket 106 about lead screw 74. Dog coupler 112 is selectively engaged by a coordinate dog coupler 114 which is positioned around lead screw 74 and rotationally locked to it by the inclusion of a slot 116 which engages a coordinate spline or key 118 in lead screw 74.

Dog coupler 114 is vertically movable on lead screw 74 by an eccentric assembly 120 which includes a roller cam 122 rotatable on shaft 124, shaft 124 eccentrically extending from an end of can shaft 128. Cam 122 is positioned within circular slot 130 in and around dog coupler 114. Cam shaft 128 is rotatably supported by bearings (not shown) in support mount 132, which is in turn mounted on top of plate 134 of base 28. Cam shaft 128 is rotated by a control wheel 136 attached to its end region 138.

In the indicated position of shaft 124, with roller cam 122 in a lower position, dogs 140 and 142 of dog couplers 112 and 114 are positioned apart, and thus sprocket 106 and dog coupler 112 would simply rotate freely on lead screw 74 and would not drive lead screw 74. If control wheel 136 is rotated to move roller cam 12 to an upper position, dog coupler 114 would be raised, and dog couplers 112 and 114 would engage. In this posture, with the rotation of sprocket 106, lower dog coupler 114 would rotate, and it would, via the rotary interlocking of key 118 and slot 116, cause lead screw 74 to rotate, under the power of sprocket 102, speed reducer 100 and motor 94. Typically, motor 94 would be a reversible motor and would, by means of controls (not shown), enable the up or down movement of cross arm 58 and may in some instances provide selectable speeds.

Figure 5:
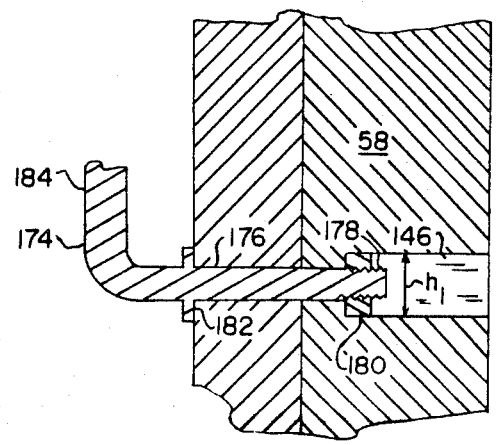
FIG. 5 is a sectional view of a cross arm and tool arm as seen along line 5—5 of FIG. 4.

Tool assemblies 54 and 56 each hold one of each pair of cutting tools 50 and 52 by nut 53. These pairs of cutting tools 50 and 52 are adjustable such that each individual cutting tool is independently movable to a selected lateral position whereby a selected cut can be made from each side of each of brake rotors 12 and 14. Except that tool assemblies 56 and 54 are right- and left-handed, respectively, they are identical. FIGS. 4, 5, and 6 illustrate in detail one of them, right-hand assembly 56. Each assembly is mounted on an end region of cross arm 58 through a slot 146 (FIG. 6) in the cross arm, this slot being particularly illustrated in FIG. 4 as having a height $H_1$ in a rear portion and a smaller height $H_2$ in a front portion. Each tool assembly 54 and 56 has a pair of tool arm assemblies, and caliper assembly 56 employs outer and inner tool arms 148 and 150, respectively. Each tool arm is supported on a like member and with respect to inner tool arm 150 by a pair of spaced pins 152 and 154, which are tightly embedded within tool arm 150. The ends of pins 152 and 154 extend for a discrete distance, for example, 0 to $3\frac{3}{8}''$ within slot 146. These pins have a diameter such as to make a close sliding fit within the $H_2$ region of slot 146. Other tool arm 148 is laterally adjustable by adjustment of bolt 158, which has a threaded region 159 which threads into tool arm 148, and which is held axially fixed by support block 160 rigidly attached to cross arm 58. The axial position of bolt 158 is maintained by extending a nonthreaded portion 162 through opening 164 in block 160 and by the provision of shoulder regions 166 and 168 on bolt 158 which are axially fixed on the bolt and which provide a bearing surface between the two opposite surfaces 170 and 172 of block 160. By virtue of the two spaced pins 152 and 154 (as shown for inner tool arm 150), which provides in slot 146 a horizontal reference, and by bolt 158, which provides a horizontal biasing left and right, it to be appreciated that by rotating knob 161, tool arm 150 is movable in a purely horizontal direction. The same, of course, is true for tool arm 148. Since one of each pair of cutting tools 50 and 52 are mounted on each tool arm 148 and 150, their movement is likewise confined to purely horizontal movement, a most desirable feature.

Once adjusted to a selected position, each of tool arms 148 and 150 is firmly compressed against the face of cross arm 58 to finally lock them in position, this being accomplished by means of a locking member 174 for each tool arm. Locking member 174 is basically a rod 176 (FIG. 5) having threads 178 at one end which thread into a nut 180, nut 180 being sized to just fit within the $H_2$ portion of slot 146. A shoulder 182 is formed on each rod 176 at a point spaced from threads 178 such that, when a locking member 174 is rotated by its handle 184, it may be threaded into nut 180 and compress the caliper arm against cross arm 58.

Figure 7:
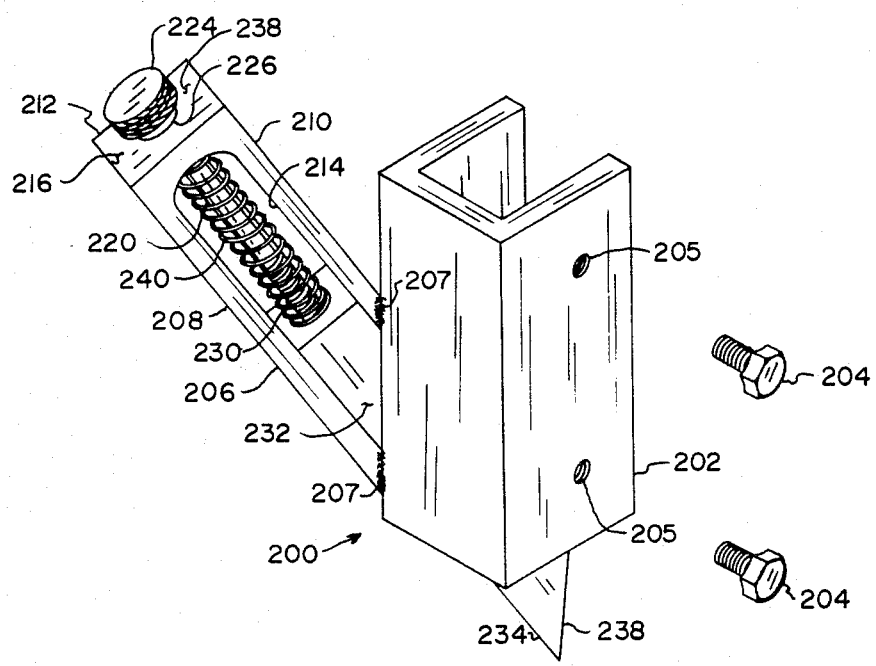
FIG. 7 is a pictorial view illustrating the details of construction of the antichattering assembly.

As an additional feature of this invention, an antichatter assembly 200 is constructed as shown in FIG. 7 and attached as shown in FIGS. 2, 4, and 8-10 for reducing or eliminating undesirable vibrations, or "chatter," of the brake rotor. A clamp bracket 202 having clamp bolts 204 and threaded openings 205 is welded by weld 207 or otherwise affixed to a damper guide 206. Guide 206 is closed on sides 208, 210 and 212 to form an elongated channel 214 which is closed on end 216. An opening 218 in end 216 slidably accommodates rod 220 which is threaded on its lower end region 230. Lower end 230 of rod 220 threadably engages a rectangular bar or damper 232 (manufactured from brass or other like, softer than steel, substance) which slidably fits within channel 214 and extends downward and outward from channel 214. End 234 of damper 232 is machined to form a beveled contact surface 238 that engages brake rotor 236. Affixed to upper end 222 of rod 220 is a damper retract/release knob 224 having a shoulder 226 that abuts top surface 228 of guide 206 when knob 224 is rotated to either extend or retract damper 232. A spring 240 within guide 206 and positioned around rod 220 biases damper 232 away from end 216 and insures that damper 232 (and thus contact surface 238) is constantly urged against rotor 236 during the resurfacing process. It is to be noted that bracket 202 and thereby guide 206 and damper 232 are positioned and clamped (by bolts 204 and threaded openings 205 in bracket 202) as shown in FIG. 4 to tool arm 148 so that contact surface 238 of damper 232 makes contact with rotor 236 at a point adjacent to but slightly interior or, with respect to rotor 236, tool cutters 50 and 52. This is advantageous in that the dampening of chatter-causing vibration is effected as close as possible to their source, i.e., tool cutters 50 and 52. A second advantage is that since tool cutters 50 and 52 and damper 232 are all three in a fixed relationship with each other during the resurfacing process, vibrations are dampened optimumly throughout the entire process, resulting in a smoother resurfaced area on brake rotor 236. Finally, with damper 232 being positioned slightly interior of tool cutters 50 and 52 on rotor 236, the radially outward movement of these cutters on this rotor results in damper 232 engaging rotor 236 during the time cutters 50 and 52 are cutting this rotor and immediately after they have finished cutting it, thus providing a dampening effect during the entire resurfacing process.

Opposite tool arm assembly 54 is a mirror image of caliper arm asembly 56. Otherwise, its components, its mounting, and its operation are the same as described above for caliper arm assembly 56, and like component designations bear the same numerical designations.

Figure 8:
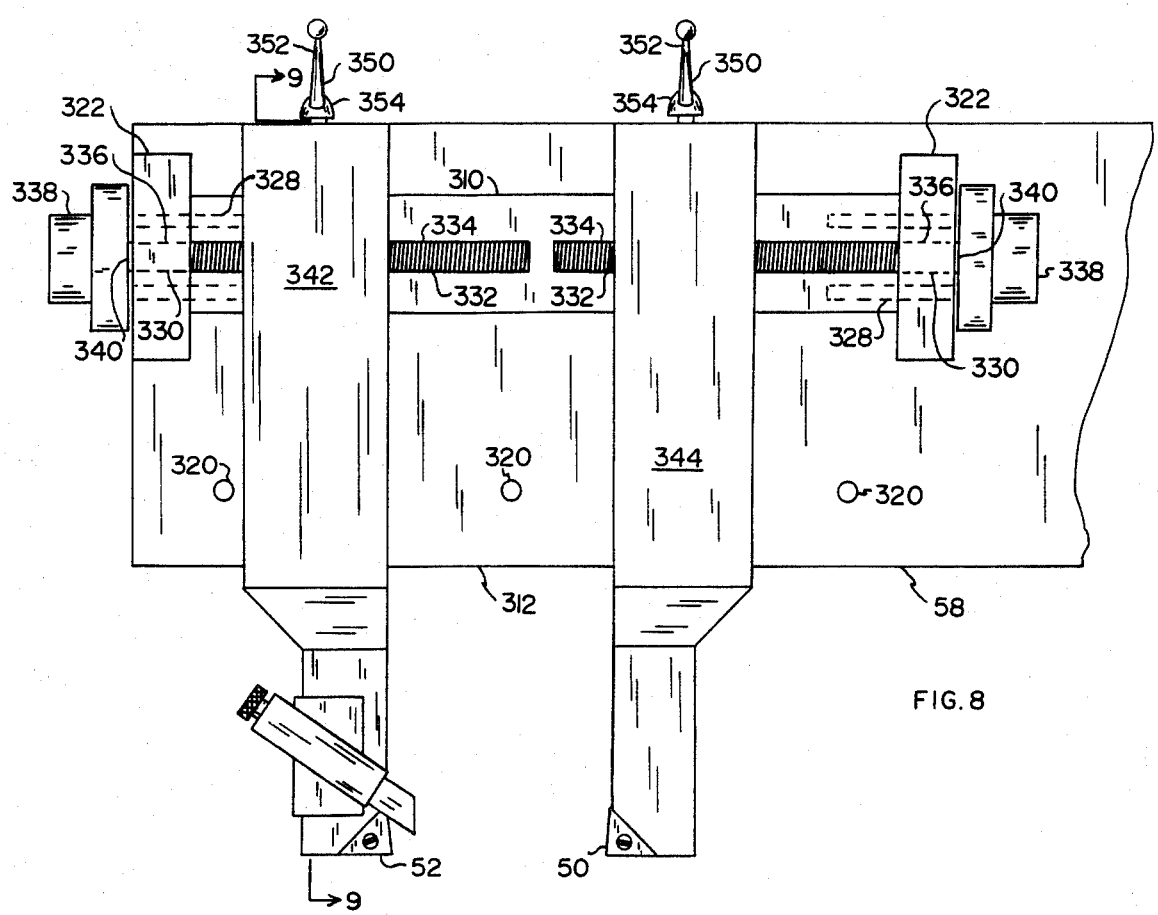
FIG. 8 is a pictorial view of an alternate embodiment illustrating a dovetail way supporing each tool arm.
Figure 9:
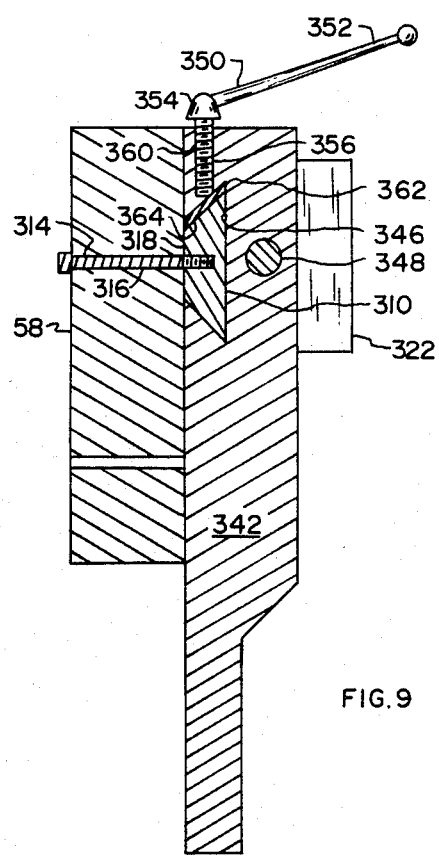
FIG. 9 is a sectional view taken along line 9—9 of FIG. 8.
Figure 10:
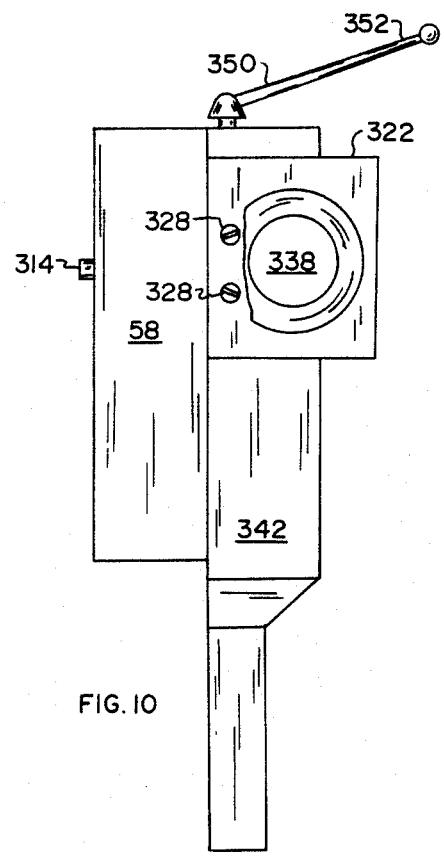
FIG. 10 is an end view of that illustrated in FIG. 8.

Referring now to FIGS. 8-10, there is shown an alternate method of supporting tool arms on cross arm 58 employing a dovetail way. In this embodiment, a dovetail way 310 is bolted to end region 312 of cross arm 58 via bolts 314. These bolts 314 extend through upper holes 316 in cross arm 58 and thread into side 318 of dovetail way 310. If desired, bolts 314 may extend through lower holes 320 in cross arm 58 to support way 310 in a lower position. A pair of end blocks 322 are bolted to dovetail way 310, with each end block being fastened to an opposite end of way 310 via machine screws 328. Opening 330 in each end block 322 rotatably supports one of a pair of elongated rods 332 that extend parallel to but spaced from dovetail way 310. Each rod 332 is configured having a threaded region 334 and a non-threaded region 336 with its non-threaded region 336 being rotatably supported by bearings (not shown) in each end bracket 322. A knob 338 is secured to end 340 of each non-threaded region 336, and this knob 340 may be calibrated. A pair of like tool arms 342 and 344 are supported on dovetail way 310, with each arm having a dovetail groove 346 cut therein. These dovetail grooves 346 are sized such that tool arms 342 and 344 are slidable longitudinally along way 310. A threaded opening 348 extends through each tool arm 342 and 344, and threaded region 334 of one of rods 332 is threaded therethrough. Thus, as each knob 338 is rotated, thereby rotating rod 332, the rotation of threaded region 334 within threaded opening 348 causes that respective arm 342 or 344 to slidably move along dovetail way 310.

Once tool arms 342 and 344 are properly positioned, a locking lever 350 on each arm 342 and 344 is engaged to lock the arms in position. These locking levers 350 consist of a hand lever 352 supported on a housing 354 that connects to a shaft 356 that extends through opening 360 in each arm 342 and 344. Shaft 356 terminates at a gib 362 that, when locking lever 350 is activated, clamps downward against the upper surface 364 of dovetail way 310, thereby retaining each tool arm in place. To release the clamping force of gib 362, hand lever 352 is rotated so as to raise gib 362 up from upper surface 364. Thus, arms 342 and 344 may be positioned and repositioned as need be on dovetail 310, and when in place, each arm may be locked in place so that they remain stationary during any subsequent operation utilizing cutting tools 50 and 52. An antichattering assembly 200 is clamped to tool arm 342 so as to reduce the chattering of a brake rotor as described above with respect to tool arm 148. The opposite end region (not shown) of cross arm 58 is configured having a mirror image of the dovetail method of supporting tool arms as just described. Otherwise, its components, mountings and operation are the same as described above.

To institute operation of the brake lathe, first, cross arm 58 would be raised either by hand wheel 84 or by operation of motor 94 to raise cross arm 58 to a position where pairs of tools cutters 50 and 52 and pairs of antichattering assemblies 200 would be above and out of the way of brake rotors to be installed. Then, brake rotors 12 and 14 would be installed as shown in FIG. 1 and tightened in place in a conventional manner, being located on shaft 20 at a general mid point position with respect to the adjustment of their respective tool assemblies. Next, either manually or by means of the operation of motor 94, lead screw 74 would be rotated in a direction to lower the tool arms just adjacent to the periphery of the brake rotors. Then, the tool arms would be adjusted so that each of the pairs of cutting tools 50 and 52 would just clear the surfaces of the brake rotors. Likewise, knob 224 of each of the antichattering assemblies 200 would be adjusted such that damper 232 would clear its related rotor. Then, lead screw 74 would be operated to move tool cutters 50 and 52 (and antichatering assemblies 200) downward to a point just opposite the inner diameter of the braking surface of the brake rotors. Then, with motor 48 operated on to rotate the brake rotors, each of the tool arms would be adjusted inward to make a desired depth of cut into a rotor. Dampening on each rotor 12 and 14 would be adjustably set by rotating each knob 224 in a direction to enable the engagement of damper 232 with each of their respective rotors 12 and 14. Then, knob 224 would be further rotated in the same direction such that damper 232 would be biased against the rotor by the force of spring 240. After this adjustment, motor 94 would be operated on in a direction to effect the upward movement of block 75 and thus cross arm 58. Then, control wheel 136 would be operated to raise dog coupler 114 into engagement with dog coupler 112 and produce actual rotation of lead screw 74. In this manner, the cutting tools would move upward and radially outward with respect to the brake rotors, thereby machining both surfaces 186 of both brake rotors 12 and 14 at one time. When the cutting tools of the tool arms clear the rotors, shortly thereafter the dampers 232 of the antichattering assemblies 200 will also clear the rotors, and at this point, knob 224 would be rotated to retract dampers 232. Then, control wheel 136 would be operated to cause dog member 114 to disengage dog member 112, thus stopping further upward travel of cross arm 58. Then, motor 48 would be turned off and brake rotors 12 and 14, as resurfaced, removed from shaft 20.

By effecting dampening adjacent to the point of cutting, the buildup of vibrational forces is attenuated essentially at its source, enabling substantially increased rates of machining and thus more efficient operation. Additionally, of course, not only are two brake motors machinable at one time for significantly decreased costs, they are machined such that the left and right wheel rotors of a vehicle are machined coordinately with the relative direction of engagement between a pad and rotor. This, in effect, creates a like direction operable thread appearance on the brake rotors so that when the rotors are placed back on a vehicle, the brake pads on each side of a vehicle see a like pattern of resistance and force. This enables a very smooth breakin for newly machined rotors and less pad wear. Further, by effecting a purely linear adjustment of cutting tools as opposed to a rotational one, as is typically the case, more control of the cutting tool is possible while machining the disc brake rotors, thereby providing a smoother machined brake rotor.

What is claimed is:
1. A disc brake lathe comprising: a machine base;
a support stand on said base
vertical guide means supported by said stand for providing a stationary planar way means;
a cross arm assembly having guide surfaces interfacing with said way means and configured to enable aligned and confined movement of said cross arm assembly along said way means;
at least one disc brake tool assembly secured to said cross arm assembly, and wherein said disc brake tool assembly comprises a pair of caliper arms, and a cutting tool being attached to each tool arm, and each said cutting tool being oriented to face an oppositely positioned cutting tool;
a shaft rotatably supported by said machine base having means to rotably support at least one disc brake rotor at a selected position;
drive means including an electrical motor rotating said shaft about its longitudinal axis; and
an antichatter assembly supported by said tool assembly and positioned to engage a single side of the disk brake rotor comprising:
a frame including a hollow tube-like housing mounted on said arm and extending toward a single side of the disc brake rotor when the rotor is supported on said shaft,
a block contoured to engage and move along within said tube-like housing and having an end surface contoured planarly to engage a generally flat side region of a disc rotor mounted on said shaft, said block being positioned to engage at least a radially outer region of the rotor, and
spring bias means on said tube-like housing for resiliently applying a bias force to said block and thereby applying a dampening force to said rotor; and
feed means moving said tool assembly and antichatter assembly into engagement with said rotor.
2. A disc brake lathe as set forth in claim 1 wherein said block is a non-ferrous metal and said bias means includes a spring coupled between said frame and said block.
3. A disc brake lathe as set forth in claim 1 wherein said frame of said antichatter assembly is supported by attachment to said tool assembly, and said end surface of said block is in engagement with said rotor adjacent to the place of engagement with said rotor of said cutting tool, and wherein with said cutting tools being moved by said disc brake tool assembly away from engagement with a disc rotor, said block remains in engagement until said cutting tools disengage with said disc rotor.
4. A disc brake lathe as set forth in claim 3 wherein said antichatter assembly is supported by attachment to said tool arm of said caliper assembly.
5. A disc brake lathe as set forth in claim 2 wherein said non-ferrous metal is brass.
6. A disc brake lathe as set forth in claim 1 wherein:
said cross arm assembly includes an elongated cross arm, extending across and beyond and on opposite sides of said guide means and said guide surfaces being planar and interfacing with said way means and configured to enable an aligned and confined linear movement of said cross arm assembly along said planar way means;
said disc brake tool assembly comprises a first disc brake tool arm assembly secured to one end region of said cross arm and a second disc brake tool arm assembly secured to an opposite end region of said cross arm, whereby each said tool arm assembly moves in unison with said cross arm, and wherein each disc brake tool arm assembly comprises a pair of adjustable tool arms extending generally along a plane parallel to said cross arm;

said antichatter assembly including one such assembly attached on each said disc brake tool arm assembly;

said shaft extends outward on opposite sides of said machine base and parallel with said cross arm, and said shaft includes means to mount a set of two disc rotors on opposite side regions of said machine base;

said disc brake lathe includes cross arm drive means, in turn including a motor supported by said machine base, for driving said cross arm assembly at a selected speed in at least one direction normal to the direction of extension of said cross arm; and wherein, with a set of two disc rotors axially secured on said shaft at opposite side regions of said machine base, said tool arms would be positioned and spaced to make cuts on said rotors, and each said block of said antichattering assemblies would be positioned against a said rotor, then said cross arm drive means would be operated to cause said cutting tools to traverse, radially, said rotors, in unison, and thereby machine opposite surfaces on each of a set of two brake rotors while said block is in engagement with each said disc rotor.

7. A disc brake lathe as set forth in claim 6 wherein said antichatter assembly is supported on a said tool arm of each said disc brake tool arm assembly.

8. A disc brake lathe as set forth in claim 6 wherein said cross arm drive means includes a feed drive shaft having an intermediately positioned threaded portion, means for rotably and axially supporting said feed drive shaft on said stand, and said cross arm assembly including an intermediately threaded region configured to receive said threaded portion, whereby, by rotation of said feed drive shaft, said cross arm assembly is moved parallel with said way means.

9. A disc brake lathe as set forth in claim 8 wherein said cross arm drive means includes:
means for selectively engaging and disengaging said motor of said drive means from said cross arms;
manual operating means for manually rotating said feed drive shaft when said motor is disengaged.

10. A disc brake lathe as set forth in claim 9 wherein said manual operating means comprises a hand wheel attached to one end region of said feed drive shaft.

11. A disc brake lathe as set forth in claim 10 wherein said cross arm drive means comprises:
a first rotary coupler rotably driven by said motor having a first engaging surface;
a second rotary coupler rotably linked to said feed drive shaft and having a second engaging surface; and
operating means for selectively engaging and disengaging said first and second surfaces;
whereby, when said first rotary coupler is rotated and said engaging surfaces are engaged, said feed drive shaft is rotated, and said cross arm assembly is moved along said planar way means.

12. A disc brake lathe as set forth in claim 11 wherein said first engaging surface comprises a first plurality of spaced engaging dogs, and said second engaging surface comprises a second plurality of spaced engaging dogs configured to interface with said first engaging dogs.

13. A disc brake lathe as set forth in claim 11 wherein said first rotary coupler comprises a first annular collar rotably mounted around said feed drive shaft, and said second rotary coupler comprises a second annular collar mounted on and rotably coupled to said feed drive shaft, whereby said feed drive shaft is driven by said second annular collar.

14. A disc brake lathe as set forth in claim 13 wherein said second annular collar is axially movable on said feed drive shaft, and said operating means includes means for axially moving said second annular collar along said feed drive shaft, whereby said first and second annular collars are engaged and disengaged.

15. A disc brake lathe as set forth in claim 11 wherein said planar way means is vertical.

16. A disc brake lathe as set forth in claim 11 wherein a disc brake caliper assembly includes:
lateral adjustment means for lateral adjustment of the position of attachment of said tool arms with respect to said cross arm; and
attachment means for loosening and tightening attachment between a said pair of said tool arms with respect to said cross arm.

17. A disc brake lathe as set forth in claim 16 including means for rididly supporting said tool arms on said cross arm parallel to said planar way means, and further including means for adjusting each said tool arm along a direction parallel to the longitudinal axis of said cross arm.

* * * * *